United States Patent [19]

Thissen

[11] Patent Number: 4,537,678

[45] Date of Patent: Aug. 27, 1985

[54] ROTARY BIOLOGICAL CONTACTOR

[75] Inventor: Christopher P. Thissen, Austin, Minn.

[73] Assignee: Walker Process Corporation, Aurora, Ill.

[21] Appl. No.: 657,507

[22] Filed: Oct. 4, 1984

[51] Int. Cl.³ .............................................. C02F 3/08
[52] U.S. Cl. ...................................... 210/150; 261/92
[58] Field of Search ....................... 210/619, 150, 151; 261/112, 92

[56] References Cited

U.S. PATENT DOCUMENTS

| 3,630,366 | 12/1971 | Joost | 210/150 |
|---|---|---|---|
| 3,777,891 | 12/1973 | Stengelin | 210/150 |
| 3,827,559 | 8/1974 | Gass et al. | 210/150 |
| 3,847,111 | 5/1975 | Prosser | 210/150 |
| 3,904,525 | 9/1975 | Rosenberg | 210/150 |
| 3,956,127 | 5/1976 | Holmberg | 210/150 |
| 3,997,443 | 12/1976 | Thissen | 210/150 |
| 4,115,268 | 9/1978 | Thissen | 210/150 |
| 4,200,532 | 4/1980 | Iwatani et al. | 210/151 |
| 4,268,385 | 5/1981 | Yoshikawa | 210/150 |
| 4,477,394 | 10/1984 | Armstrong et al. | 210/150 X |

FOREIGN PATENT DOCUMENTS

| 935162 | 8/1963 | United Kingdom . |
|---|---|---|
| 1397664 | 6/1975 | United Kingdom . |

OTHER PUBLICATIONS

"Carter Bio-Drum and the Activated Biofilm Method", Ralph B. Carter Co., 1978.

Primary Examiner—Thomas Wyse
Attorney, Agent, or Firm—Marshall, O'Toole, Gerstein, Murray & Bicknell

[57] ABSTRACT

A rotary biological contactor for treating waste water comprising a center core or shaft and a plastic media on the shaft and arranged in a multiplicity of modules spaced from each other, each module including a multiplicity of turns of plastic sheet material with edges at the ends of the module, the turns of plastic sheet material having elongate undulations extending obliquely of the rotation axis and of the ends of the module, adjacent turns of the plastic sheet material having the undulations extending transversely of each other so that each elongate undulation traverses a multiplicity of undulations of the next adjacent turn, each undulation being welded to the undulations of the next adjacent turn at each place where the undulations touch each other, and the plastic sheet material also having circumferentially extending zones or bands traversing the undulations and extending transversely of the undulations, the bands being free of such undulating relationship, the several undulations and circumferential bands defining a multiplicity of flow channels extending in multi-oblique directions and circumferential directions for alternately filling and purging the air and water during each revolution of the module and shaft.

19 Claims, 8 Drawing Figures

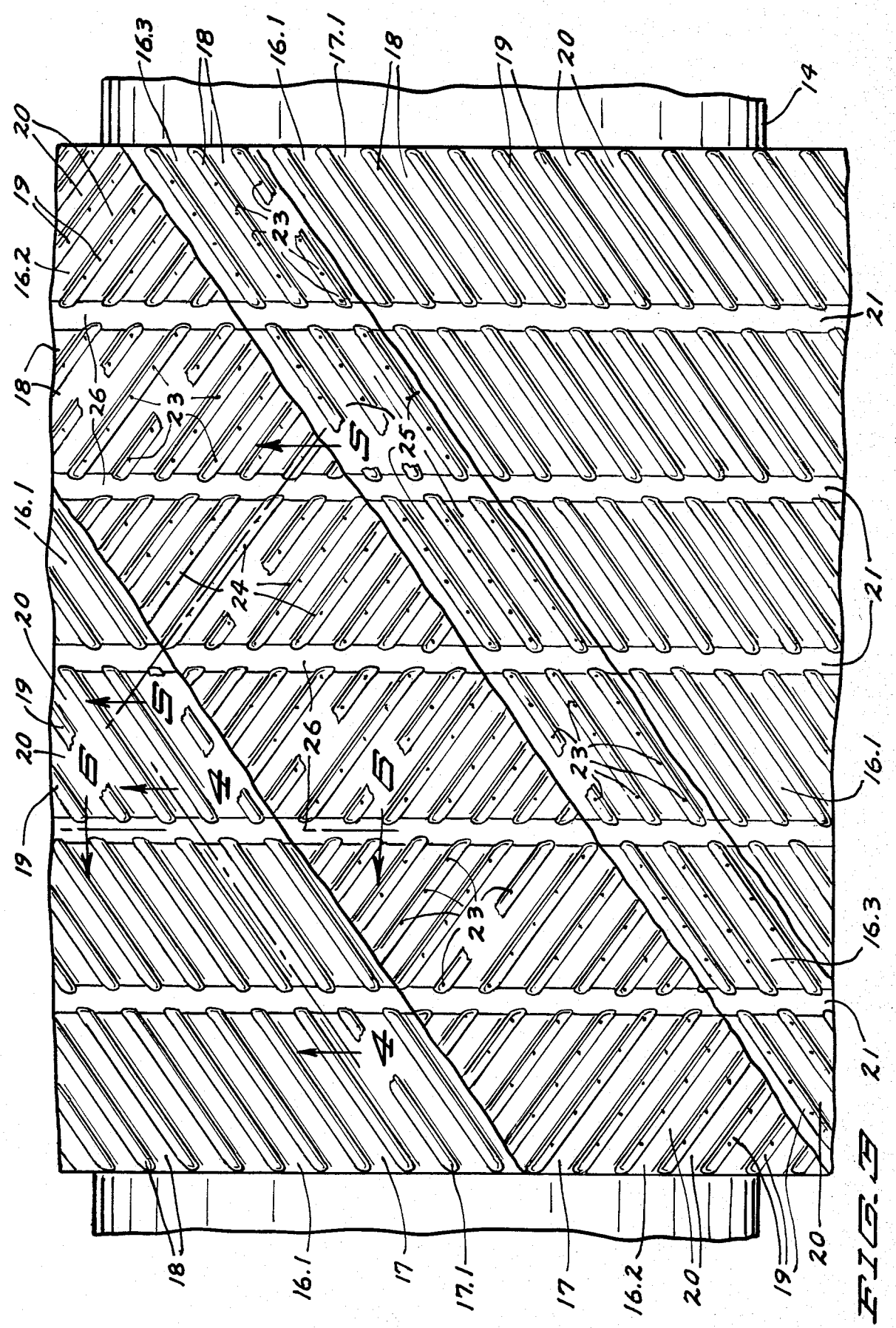

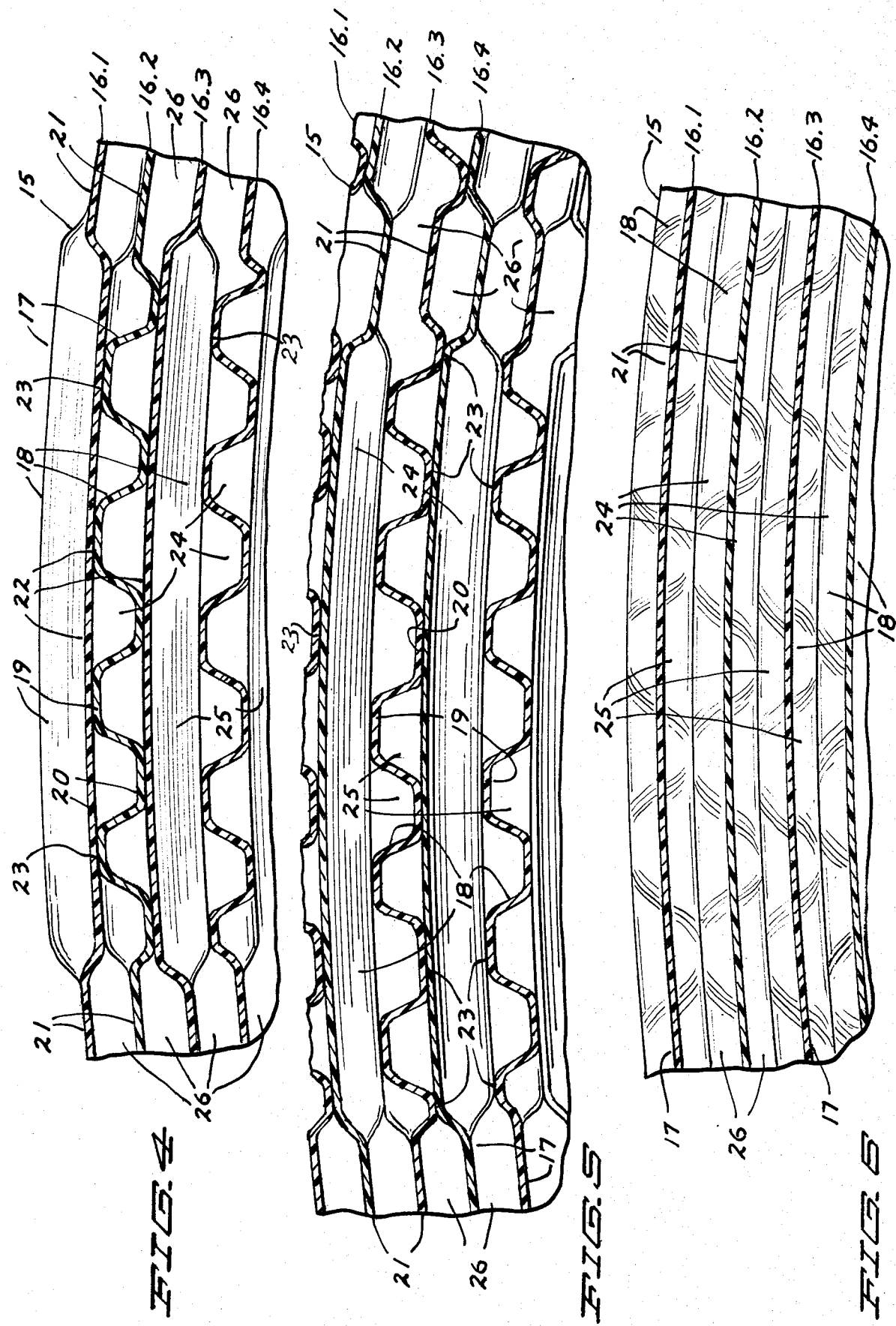

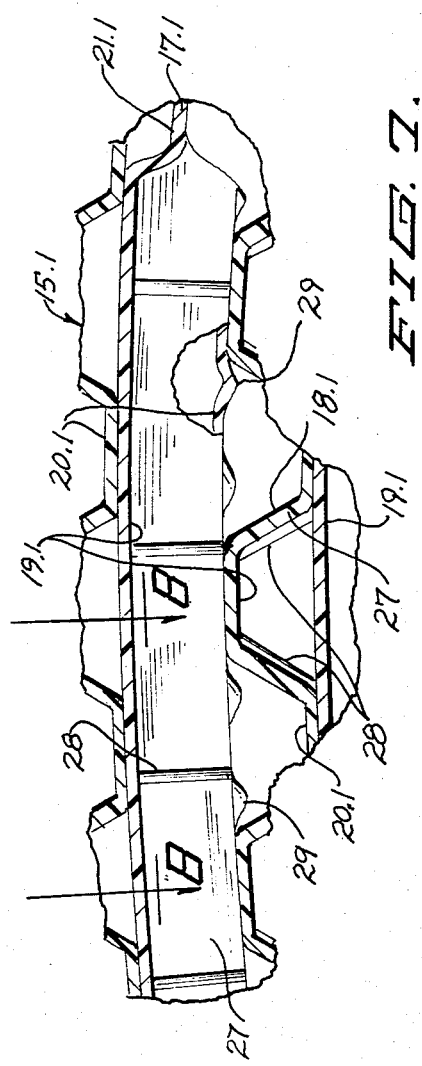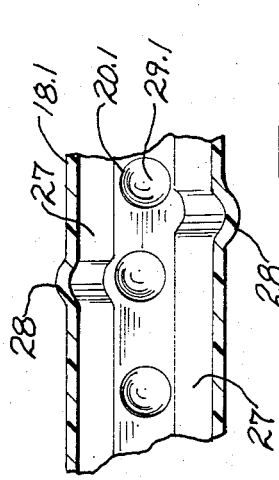

ROTARY BIOLOGICAL CONTACTOR

This invention relates to a rotary biological contactor useful in processing waste water containing biodegradable materials.

BACKGROUND OF THE INVENTION

In the process of treating waste water containing biodegradable materials, rotary biological contactors have been found to be useful for the purpose of promoting bacterial action. Such rotary biological contactors are usually rotary devices with plastic sheet material arranged to rotate through a tank of waste water and then be exposed to air in each revolution. A biomass, or biological slimes, are established on the surfaces of the plastic material, and as the rotary biological contactor revolves, it is desirable that the biomass on the plastic media be exposed to air in each cycle.

Such rotary biological contactors are large in size, typically 10 to 12 feet in diameter, and typically 15 to 25 feet more or less in length. As a result, the rotary biological contactors are expensive and are intended to have a long service life, typically in the range of 20 years or more. Numerous problems have been experienced with various materials used in such biological contactors, and of course, the shutdown and repair of such equipment adds significantly to the expense of operation.

The plastic media has taken numerous forms in the past. Oftentimes plastic disks or wafers, constructed of polystyrene, polyethylene or expanded styrofoam have been mounted on a rotating shaft with portions of the disks being immersed in the tank of waste water in each revolution. Such rotary biological contactors using disk type media are illustrated in a number of prior patents as follows:

| | |
|---|---|
| 3,630,366 | 3,777,891 |
| 3,827,559 | 3,904,525 |
| 3,997,443 | British 935,162 |

A major problem with such disk-like media is the difficulty in mounting the disks to the rotary shaft to accomplish long service life. Such disk-like media have not proven to be highly satisfactory in industrial and municipal type installations.

Other plastic media have utilized cube shaped filter sections mounted on framework spaced from the rotation axis. Such sections have used plates extending along and confronting the rotation axis and grid-like media. These sectioned media are illustrated in U.S. Pat. No. 3,847,811 and British Pat. No. 1,397,664. Such media as illustrated in these patents, has severely limited service life and high maintenance costs.

Other rotary biological contactors have used cylindrical cages of wire screen containing many plastic balls defining the plastic media on which the biomass is established. These are typified by U.S. Pat. Nos. 3,956,127 and 4,200,532. Such rotary biological contactors, as is illustrated in these patents, have limited service life and high maintenance costs.

A rotary biological contactor with a wound spirally arranged plastic sheet material is illustrated in U.S. Pat. No. 4,115,268, and has proven to be extremely reliable with long service life. Occasionally, rupturing of welds between adjacent turns of the plastic sheet material have caused some problem in deterioration of the media, requiring maintenance.

The rotary biological contactors have been mounted in the tanks of waste water in various ways, typically on fixed bearings as illustrated in U.S. Pat. No. 4,200,532. In other instances, the plastic media, using floating plastic balls of the type illustrated in U.S. Pat. No. 4,200,532 has simply been allowed to float in the water, as illustrated in a trade brochure entitled *Carter Bio-Drum and The Activated Bio-Film Method,* published by Ralph B. Carter Company, 192 Atlantic St., Hackensack, N.J., 07602, prior to 1980; and in U.S. Pat. No. 3,956,127.

Such rotary biological contactors have been revolved in the waste water treatment by electric motors turning the mounting shaft or through the use of air bubbling through the water and into pockets of the rotary biological contactor, as illustrated in U.S. Pat. No. 3,886,074.

While various systems of rotary biological contactors have attempted to address the service life problem with minimal maintenance, none of the prior art has adequately solved this problem. Accordingly, breakdowns and shutdowns of equipment has been necessary, resulting in high maintenance costs, and discharge of inadequately treated waste waters into public drainage and river systems.

SUMMARY OF THE INVENTION

An object of the invention is to provide a rotary biological contactor with a new and improved plastic media of simple and inexpensive construction and operation over a long service life with a minimum of maintenance and efficiently treating waste water.

Another object of the invention is the provision of a novel rotary biological contactor which is entirely integrally constructed in a new configuration as to resist structural faults and increase the reliability throughout an extended service life.

Still another object of the invention is to provide an improved rotary biological contactor constructed for improving the flow and purging of air and water during each revolution and maintaining a thin biomass or biological slime on the entire surface of the plastic media in a manner which also contributes significantly to the minimizing of maintenance for a long and inexpensive service life.

A feature of the invention is a rotary biological contactor with a rigid central core and a number of cylindrical treating modules on the core. Each treating module is made of plastic sheet material in a multiplicity of circumferential turns, one within the other. The turns are spaced from each other by elongate undulations in the form of elongate ridges and valleys, extending obliquely of the axis and of the end of the module. In alternate turns, the ridges and valleys extend transversely to each other and accordingly, the crests of the ridges in adjacent turns traverse each other at numerous locations. The adjacent turns are welded together at all of such points of intersection where the crests of the undulations traverse each other.

Another feature of the rotary biological contactor, is the provision in such turns of plastic, of a number of elongate bands, void of such undulations and extending transversely of the ridges and valleys, and circumferentially of the module. The bands are spaced from the crests of the ridges and prevent circumferential stretching and deformation of the turns.

The present invention has several distinct advantages. The elongate undulations which extend obliquely of the axis and of the ends of the modules, define similarly oriented flow channels which are quickly filled and purged of water and air in each revolution. The numerous intersections between flow channels cause considerable changes in velocity and turbulence in the flowing water as to prevent continuing build up of the biomass on the plastic sheet material, by continually shearing portions of the biomass and carrying it away with the flowing water. As a result, air is permitted to contact all of the remaining biomass in each revolution of the module. Also, because of the rapid purging of water, loading of the modules is minimized. The modules carry only a minimum of water above the level of the pool of water in the tank. The minimizing of loading minimizes the stresses and strains applied to the plastic media of the modules and thereby contributes materially to the service life.

Because the undulations in adjacent turns extend transversely of each other, each of the undulations traverses and is welded to several other undulations in adjacent turns. Proper spacing between adjacent turns is permanently maintained with no likelihood of rupturing between adjacent turns. The multiple points of welding of each undulation to undulations in the next adjacent turn, also minimizes any tendency of deformation in a circumferential direction, as to contribute materially to maintain the integrity of the modules over a long service life.

In the rare event, during service, of a fracture in a few of the welds, the correct spacing between adjacent turns of the plastic in the module is continued because the elongate undulations and ridges lie transversely of each other and resist any possible nesting of undulation of adjacent turns.

Any tendency of circumferential deformation in the turns is also minimized and actually prevented by the elongate bands extending transversely of the elongate undulations and circumferentially of the cylindrical modules. The bands, which are midway between the crests of the ridges and the depths of the valleys of the undulations, also establish offsets or jogs in the flow channels and thereby contribute to the mixing and turbulence of the waste water and to the changes in velocity of the waste water flowing in the channels. In addition, the bands define circumferential flow channels intersecting with all the oblique flow channels for contributing to the rapid filling and purging of air and water and contributing to turbulence and changing of velocity of the flowing water.

BRIEF DESCRIPTION OF DRAWINGS

FIG. 3 is an enlarged detail elevation view, as seen at approximately 3—3 of FIG. 2 and having portions of successive turns of the plastic media broken away for clarity of detail.

FIG. 4 is an enlarged detail section view taken approximately at 4—4 of FIG. 3.

FIG. 5 is an enlarged detail section view taken approximately at 5—5 of FIG. 3.

FIG. 6 is an enlarged detail section view taken approximately at 6—6 of FIG. 3.

FIG. 7 is a detail section view (similar to FIG. 4) of a modified form of the invention.

FIG. 8 is a detail section view taken approximately at 8—8 of FIG. 7.

DETAILED SPECIFICATION

Figure 1:
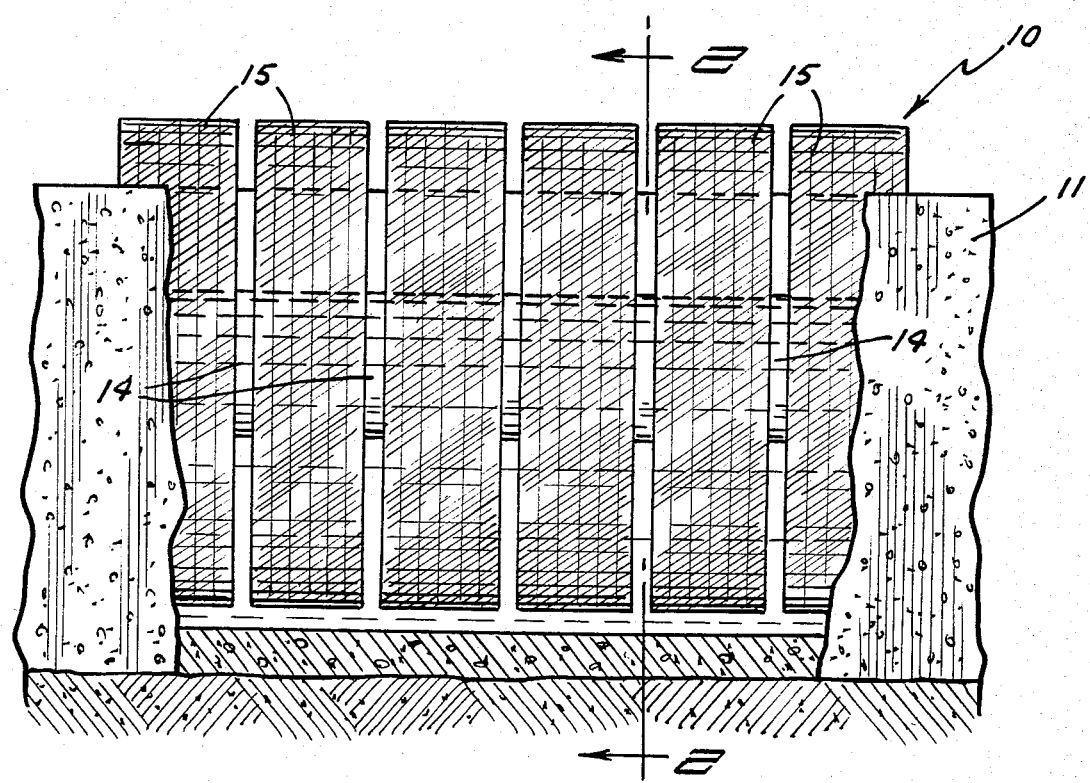
FIG. 1 is a detail section view through a tank wall and illustrating the rotary biological contactor.

One form of the invention is illustrated in the drawings and is described herein.

Figure 2:
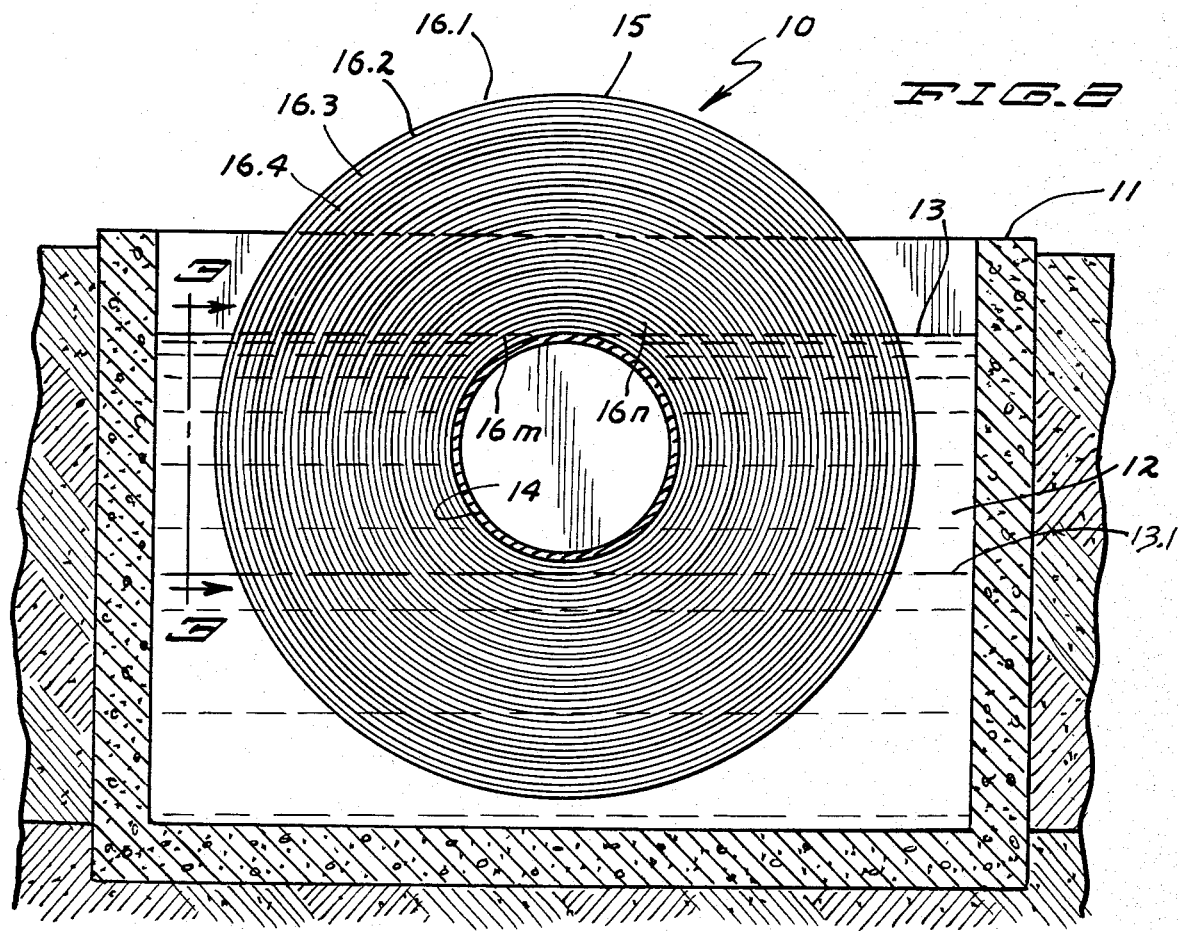
FIG. 2 is a detail section view taken approximately at 2—2 of FIG. 1.

The rotary biological contactor is indicated in general by numeral 10 and is illustrated in FIGS. 1 and 2 in a tank 11 of concrete or other similar material with a long service life. The tank has supply and discharge ports for the waste water 12. The depth of the water and the surface 13 are controlled so as to be substantially constant, which is important from the standpoint of placing the rotary biological contactor 10 in the tank.

The rotary biological contactor has a central shaft or core 14 which is cylindrical in the form shown. The shaft 14 is preferably made of steel, and is used to accommodate locating of the rotary biological contactor in a predetermined location within the tank 11, and in most instances for applying rotary power to the rotary biological contactor 10 from a suitable source of rotary power. The shaft is secured to the tank walls to be properly located in the tank. In the cylindrical form, with closed ends, the shaft is partially supported by its own buoyancy. Depending upon the nature of the shaft, the water level may be adjacent the top portion of the cylindrical shaft, as illustrated at 13, or adjacent the bottom of the shaft, as indicated at dashed line 13.1 in the drawings, or at a location intermediate the top and bottom of the shaft.

The rotary biological contactor 10 also has a plastic media, in the form of a multiplicity of cylindrical modules 15, affixed on the periphery of the shaft 14 and in spaced relation to each other. Typically, the modules 15 have a diameter of 10 to 12 feet and a width of approximately 2-½ to 3 feet. Each of the modules 15 is made up of a multiplicity of turns 16.1, 16.2, 16.3, 16.4 . . . 16.m, 16.n of sheet plastic 17 wound in a spiral or convolute around the central core or shaft 14. The sheet plastic 17 may be high density polyethylene or similar plastic that is capable of being welded to itself. The plastic sheet material is approximately 0.050 inches thick but somewhat thinner where deformed out of flat condition. The innermost turns 16.n of the convolute are affixed to the shaft as by adhesive, applied as the sheet plastic is being wound onto the core. In FIG. 3, a detail segment of the module is shown in elevation and portions of the outer turns 16.1, 16.2 sheet plastic 17 are broken away (as if they were severed and peeled off) to show the relationship among the several adjacent turns of the sheet plastic.

The sheet plastic 17 in each of the turns has a multiplicity of elongate undulations 18 forming elongate ridges 19 and valleys 20 which are especially apparent in FIGS. 4 and 5. The elongate undulations extend obliquely of the rotation axis, at an angle of approximately 35° to the axis; and obliquely of the end of the module defined by the edges 17.1 of the sheet plastic 17. The elongate undulations 18 in the sheet plastic 17 are interrupted by a multiplicity of elongate bands or strip shaped zones 21 which are smooth and void of deformations and extend transversely of the elongate undulations 18. The bands 21 traverse a number of the undulations 18, and in the form shown, are arranged to extend circumferentially of the module 15 in each of the turns. It will be recognized that the bands 21 are located in each turn, approximately midway between the height of the ridges 19 and the depth of the valleys 20.

It will also be recognized in FIGS. 3-5 that in adjacent turns of the sheet plastic 17, the elongate undulations 18 extend transversely of each other and that each undulation 18 traverses a multiplicity of undulations 18 in adjacent turns.

More specifically, alternate turns 16.1, 16.3 ... 16.m have the elongate undulations extending in one direction, oblique to the rotation axis, and in FIG. 3, extending from lower left to upper right. The alternate turns 16.2, 16.4 ... 16.n of the sheet material have the elongate undulations 18 extending parallel to each other, and in FIG. 3 from lower right to upper left, and also extending transversely of the comparable undulations 18 in adjacent turns 16.1, 16.3 ... 16.m.

In all of the turns of sheet plastic sheet material in the module, the elongate bands or narrow zones 21 which traverse the undulations 18 are arranged in confronting relation to other bands 21 in adjacent turns.

The die formed plastic sheet material in all of the turns is from the identical mold, but alternate turns of the sheet plastic are assembled into the module in inverted relation to each other, thus resulting in the transverse orientation of the elongate undulations in adjacent turns of the sheet plastic.

In relation to the die formed sheet plastic 17, it may be said that the obverse side of the sheet plastic faces radially outwardly and the reverse side faces radially inwardly in the alternate turns 16.1, 16.3 ... 16.m; whereas in the other alternate turns 16.2, 16.4 ... 16.n, the inverted plastic sheet material has the obverse side facing radially inwardly toward the shaft 14 and has the reverse side facing radially outwardly.

Finally, in relation to the elongate undulations in adjacent turns of the sheet plastic, the undulations lay upon each other in a criss-cross relationship. Each of the elongate undulations 18 traverses numerous undulations 18 in the adjacent turn inwardly of the module; and each also traverses a number of undulations 18 in the adjacent turn in an outward direction. As seen in FIG. 4, each of the elongate undulations 18 in turns 16.1 and 16.3 crosses or intersects and lays upon four or five undulations in the adjacent turns 16.2, 16.4. Similarly, the elongate undulations in each of the turns 16.2 and 16.4 also traverse and lie across five or six undulations 18 in the adjacent turns 16.1, 16.3.

Wherever each of the undulations 18 traverses or lays across another undulation in an adjacent turn, the crests 22 of the undulations in adjacent layers are welded to each other. The welds are indicated by the numeral 23. Accordingly, each of the elongate undulations 18 in each turn of the sheet plastic in the module has four or five welds 23 to the undulations in the turns of the sheet material located inwardly and outwardly of the module. The criss-cross relationship between undulations in adjacent turns of the sheet plastic assuredly prevent changes in the dimensions of the module in a radial direction; and the multiplicity of welds 23 prevent any possible relative movement, either in an axial direction or a circumferential direction, between adjacent turns of sheet material in the module. As a result, the modules 15 are extremely rigid. The welds 23 are formed during the winding of the plastic sheet material into the module. As the crests 22 of the undulations 18 are fused and then pressed together, adjacent nearby areas of the plastic are also slightly heated. Subsequent cooling of all these heated areas causes a slight shrinking of all of the turns of plastic, which results in a rigid module.

In FIG. 3, the orientation of the undulations 18 in the adjacent turns of the sheet plastic is well illustrated. The outermost turn 16.1 is broken away as to make the next adjacent turn 16.2 visible; and then the turn 16.2 is broken away as to make the next adjacent turn 16.3 visible. In turns 16.2 and 16.3, it is assumed that in graphically peeling off the outer turns of the sheet plastic, the locations of welds 23 are rendered visible because this is substantially the result when portions of the outer turns are forcibly torn off for inspection. It is clearly apparent that the several turns of the module are welded together at numerous locations 23 along each of the lengths of the undulations in adjacent layers where they cross each other.

The undulations in the turns of sheet plastic also define a network of flow channels 24, 25 and 26, all of which intersect each other at various locations. The flow channels 24 extend along the undulations 18 of alternate turns 16.2, 16.4 ... 16.n of the sheet plastic in the module; and the flow channels 25 extend along the undulations in alternate turns 16.1, 16.3 ... 16.m of the sheet plastic in the modules. Because of the numerous intersections between flow channels 24 and 25, the waste water flowing therein undergoes a constant mixing and changes of direction and velocity, producing turbulence, which causes excess portions of the biomass on the plastic sheet media to shear off and be carried away, and thereby maintain only a minimum of thickness of the biomass on the plastic sheet material. The flow channels 26 extend along and between the circumferentially extending bands 21, and these flow channels 26 also intersect with the other flow channels 24 and 25 at numerous locations so as to contribute materially to the rapid flow of waste water in purging the module of water, and also contributing materially to establishing mixing and changes in direction and velocity of the water and creating turbulence in the water.

The bands 21 which are substantially smooth and not deformed, extend circumferentially of the modules 15. Each of the bands 21 of itself, is substantially cylindrical in shape and may not be circumferentially expanded under ordinary operational circumstances, and will retain the adjacent areas of the sheet material in the several turns which contain undulations 18, from circumferentially stretching or being deformed, and thereby maintain the structural rigidity and the predetermined shape and size of each of the turns in the module. Accordingly, the bands or zones 21 contribute materially to the rigidity and long service life of the rotary biological contactor.

In operation, the waste water being treated is supplied into the tank 11 and slowly moves through it. The rotary biological contactor 10 is revolved under influence of a suitable source of rotary power. The flow channels 24, 25 and 26 between the turns of plastic sheet material are alternately filled and purged of water and air during each revolution of the modules 15. As the plastic media moves through the pool of waste water and then upwardly through the surface 13 of the water, the waste water flows quickly through all of the channels 24, 25 and 26 to the ends of each module as to be returned into the pool 12 of waste water in the tank. Water flowing in any of the channels 24 may change direction and flow through the adjacent channels 25 as well; and conversely, waste water flowing outwardly toward the ends of the module in the flow channels 25 may also change direction and flow through the flow channels 24 as well. Similarly, because all of the flow channels 24 and 25 intersect with the channels 26, which extend circumferentially of the modules, water may flow into and out of these flow channels 26 and randomly into channels 24 and 25.

As the waste water in the channels encounters intersections of flow channels, or encounters an offset or jog in the channel, produced by the bands 21 or by portions of the undulations 18, the waste water will change directions and change velocity and turbulence will result to shear away any excessive portions of the biomass which has built up onto the faces of all of the plastic sheet material in all of the turns.

Of course, as the channels 24, 25 and 26 are purged of water in each revolution, air will immediately enter the channels and promote the bacterial action as desired.

Simultaneously as the water is being purged from the channels at one side of the rotor, the flow channels at a location across the diameter of each module are being filled with waste water from the pool of water in the tank. The intersecting flow channels rapidly fill with water which flows quickly and has numerous changes in velocity and direction as the flow occurs, thus creating a turbulence in the water to continue the shearing of excess biomass from the face of the plastic sheet material in the turns of the module. Of course, as the channels are being refilled with water, the air is purged from all of the channels which are arranged so that no portion of any of the channels will retain any pockets of air during travel of the radial portions of the modules through the pool of water.

In the modified form of the invention illustrated in FIGS. 7 and 8, a modified form of module 15.1 of the rotary biological contactor is illustrated. The module 15 is the same as the module 15 in the form illustrated in FIGS. 1-6, with the exception that the sheet plastic 17.1 is slightly thinner because the plastic is stretched from its original thickness and into the somewhat deeper undulations 18.1, as compared with the undulations 18 of FIG. 1. Accordingly because the plastic is slightly thinner, it is less rigid than in the previously described modules. In this form of the invention, the walls 27 of the undulations 18.1, between the ridges 19.1, and the valleys 20.1, are provided with deformations defining elongate ribs 28 extending transversely of the walls 27 and extending between the ridges 19.1 and the valleys 20.1 of the undulations. The ribs 28 may be spaced from each other by one to two inches, such that each of the walls 27 has three to five such stiffening ribs 28 along its length and between the ends of the undulations 18 which extend to and between the circumferential bands 21.1. In any one undulation 18, the ribs 28 in opposite walls 27 thereof are located in offset relation with each other, but may also be directly opposite each other. It will be seen in FIG. 7 that the ribs extend entirely from the ridges 19.1 to the valleys 20.1 to minimize any likelihood that the walls 27 might be crushed. In this form of the module, the sheet plastic in the undulations is also provided with a multiplicity of outwardly protruding domes or lugs 29 in the valleys 20.1 of the undulations. The domes are formed by deforming the valleys 20.1 of the undulations, and form dimples 29.1 on the inner side of the valleys 20.1. The protruding domes 29 are closely spaced along the entire length of each of the undulations to provide points at which heat is concentrated for welding the valley of each undulation to the ridges of the next adjacent undulation 18.1.

It should be recognized that the ribs 28 or protruding domes 29 may be incorporated into the form of the invention illustrated in FIGS. 1-6, where necessary.

It will be seen that a rotary biological contactor having substantially cylindrical modules mounted on a rotary shaft is constructed with the modules being made up of a multiplicity of turns of plastic sheet material, one within the other, and wherein the turns have elongate undulations extending obliquely of the axis and obliquely of the end faces of the modules, and wherein the undulations in adjacent turns extend transversely across each other and are welded to each other thereby defining a network of flow channels extending in multiple directions transverse to each other. The turns of plastic sheet material also have elongate bands or zones which are relatively undeformed and extend transversely of said elongate undulations so as to prevent any deformation of the undulations and hold them in their desired predetermined position and shape, thereby minimizing any likelihood of circumferential expansion of any of the turns in the module, altogether contributing to the structural rigidity of the rotary biological contactor and its long service life.

I claim:

1. A rotary biological contactor to be partially immersed in a tank of waste water being processed, comprising
    mounting means including a rigid central core to accommodate locating the contactor in the tank, and
    a cylindrical waste water treating module upon which biological slimes and biomass are established, the module being affixed on the central core and including a multiplicity of circumferential turns of stiff sheet plastic one within the other and having substantially aligned edges defining the ends of the module, the sheet plastic in the turns having a multiplicity of elongate undulations forming elongate ridges and valleys extending obliquely of said edges, adjacent turns of the sheet plastic having the elongate undulations extending transversely of each other, the ridges in the sheet plastic having crests welded to the next adjacent turn of the sheet plastic and preventing deformation of the module along and around the rotation axis and maintaining uniform and constant spacing in a radial direction, the undulations forming a multiplicity of intersecting flow channels extending to the ends of the module for establishing numerous diverse routes for flow of water and air and alternate filling and purging of the channels in each revolution in the tank, the alternate filling and purging of the flow channels causing mixing, turbulence, and changes of velocity of the water and continued shearing of excess biomass from the sheet plastic.

2. A rotary biological contactor according to claim 1 and the sheet plastic having means deforming the elongate undulations and producing variations in the shapes of the flow channels to cause mixing and turbulence and change in velocity of the flowing water.

3. A rotary biological contactor according to claim 1 and the sheet plastic having a multiplicity of spiral convolutions defining the turns.

4. A rotary biological contactor according to claim 1 and the ends of the modules lying in planes normal to the rotation axis.

5. A rotary biological contactor according to claim 1 and the crest of each ridge being welded at a multiplicity of locations to the next adjacent turn.

6. A rotary biological contactor according to claim 5 and each undulation having a multiplicity of rounded protuberances at which welding occurs between adjacent turns in the module.

7. A rotary biological contactor according to claim 1 and the turns also having elongate zones extending transversely across a plurality of undulations and producing variations in the shapes of the flow channels and also retaining adjacent undulations against deformation.

8. A rotary biological contactor according to claim 7 wherein said elongate zones form bands extending circumferentially of the module.

9. A rotary biological contactor according to claim 8 wherein said elongate zones are spaced from the ends of the modules.

10. A rotary biological contactor according to claim 1 wherein the elongate undulations of sheet plastic have walls extending between the ridges and valleys, each of the walls have a plurality of deformations defining elongate ribs extending transversely of the wall and toward the adjacent ridge and valley.

11. A rotary biological contactor to be partially immersed in a tank of waste water being processed, comprising mounting means including a rigid central core to accommodate locating the contactor in the tank, and a cylindrical waste water treating module upon which biological slimes and biomass are established, the module being affixed on the central core and including a multiplicity of circumferential turns of stiff sheet plastic one within the other and having a multiplicity of elongate undulations forming elongate ridges and valleys, adjacent turns of the sheet plastic having the elongate undulations extending transversely of each other, the ridges in the sheet plastic having crests welded at a multiplicity of locations to the next adjacent turn of the sheet plastic and preventing deformation of the module along and around the rotation axis and maintaining uniform and constant spacing of the turns in a radial direction, and the turns of the sheet plastic also having a plurality of elongate bands formed integrally thereof and extending transversely of and intersecting a multiplicity of said undulations for maintaining the pitch of adjacent undulations and preventing circumferential stretching of the turns of plastic by deformation of adjoining ridges and valleys, the undulations forming a multiplicity of intersecting flow channels with offsets formed at said bands and extending to the ends of the module for establishing numerous diverse route for flow of water and air in alternate filling and purging of the channels in each revolution in the tank, the bands and intersecting flow channels producing turbulence, mixing and changing of velocity of the water in the channels to shear off and carry excess biomass to expose water and slime to air during filling and purging of the channels.

12. A rotary biological contactor according to claim 11 wherein the bands extend circumferentially of the module, each band producing offsets in the flow channels adjoining the turn of sheet plastic on both sides thereof.

13. A rotary biological contactor according to claim 11 and the elongate bands confronting each other to define additional flow channels intersecting with numerous of the first mentioned flow channels to contribute to the alternate filling and purging of water and air.

14. A rotary biological contactor according to claim 11 wherein the elongate undulations extend obliquely of the rotation axis.

15. A rotary biological contactor according to claim 14 and said bands being spaced from the ends of the modules and extending circumferentially of the module.

16. A rotary biological contactor to be partially immersed in a tank of waste water being processed, comprising mounting means including a rigid central core to accommodate locating the contactor in the tank, and a cylindrical waste water treating module upon which biological slimes and biomass are established, the module being affixed on the central core and including a multiplicity of first and second turns of stiff sheet plastic, one within the other, and having substantially aligned edges defining the ends of the module, the first circumferential turns of the sheet plastic having a multiplicity of elongate undulations forming elongate ridges and valleys extending transversely of said edges and defining flow channels alternately filled and purged with water and air as the module is revolved in the tank, the second circumferential turns of sheet plastic spanning the crest of the undulations and being welded thereto at numerous points along each of the crests for preventing deformation of the module along and around the rotation axis and maintaining constant spacing in a radial direction, while inducing rapid flow of the waste water and air during filling and purging and carrying away of portions of the biomass.

17. A rotary biological contactor according to claim 16 and said second turns of the sheet plastic having deformations producing flow passages transversely of said undulations and permitting flow of water and air transversely between adjacent undulations of such first turns of the sheet plastic.

18. A rotary biological contactor according to claim 16 and the second circumferential turns also having elongate undulations forming elongate ridges and valleys extending transversely to the ridges and valleys of the first circumferential turns and defining second flow channels intersecting with said first mentioned flow channels for carrying waste water therebetween.

19. A rotary biological contactor according to claim 18 wherein the first and second circumferential turns of sheet plastic having elongate linear zones traversing the elongate undulations of the first and second turns and retaining the turns against deformation in a direction transverse to said undulations and also defining third flow channels intersecting said second flow channels and said first mentioned flow channels for producing mixing and turbulence and changes in velocity of the waste water to cause shearing and carrying of portions of the biomass from the sheet plastic in the turns.

* * * * *